Jan. 31, 1950     C. CHILOWSKY     2,495,697
METHOD AND APPARATUS FOR INTENSIFYING ELECTRONIC IMAGES
Filed June 8, 1946     6 Sheets-Sheet 2

INVENTOR
CONSTANTIN CHILOWSKY
BY Brown & Seward
ATTORNEYS

Jan. 31, 1950

C. CHILOWSKY 2,495,697

METHOD AND APPARATUS FOR INTENSIFYING ELECTRONIC IMAGES

Filed June 8, 1946

INVENTOR.
CONSTANTIN CHILOWSKY
BY Brown & Seward
ATTORNEYS

INVENTOR.
CONSTANTIN CHILOWSKY
BY
Brown & Seward
ATTORNEYS

Patented Jan. 31, 1950

2,495,697

UNITED STATES PATENT OFFICE 2,495,697

METHOD AND APPARATUS FOR INTENSIFYING ELECTRONIC IMAGES

Constantin Chilowsky, New York, N. Y.

Application June 8, 1946, Serial No. 675,502

17 Claims. (Cl. 250—141)

This invention relates to a method and means for reinforcing the luminous effects that can be produced by electrons. It concerns particularly the intensification and amplification of images produced by means of electrons derived from a photocathode, or in a scanning electronic beam of a television tube.

The invention refers to image projection through light valves controlled by electrons or electronic beams, for instance light valves with suspension in liquid. Most particularly it refers to reproduction and light projection of opacity images produced by electrons projected into a sensitive crystalline salt layer of alkali halides and alkaline earth halides such as for instance, sodium chloride and bromide, potassium chloride and bromide, or other salts or materials having similar properties.

When the light is projected through a layer of sensible salt on which an opacity image is formed (either by electrons of the photocathode or those of the cathodic beam of a television tube), a serious difficulty arises from the fact that the number of electrons per cm.$^2$ necessary to produce in this salt an opacity image sufficiently strong for light projection, is relatively high. Furthermore, even for strong television cathodic beams, the surface of the salt layer and of its image must remain relatively small (for instance a few cm.$^2$), and the image can have only a very limited number of points.

For the same reason, a simple layer of sensible salt cannot be used for production and projection of an opacity image obtainable from a weak electronic image (corresponding for instance to a weak lighting of the photocathode).

The present invention is directed to eliminating these difficulties. This result is obtained by a new method of electronic concentration and by introducing a new special device denominated in this description the "black filter."

The black filter is a screen of a completely opaque material, generally insulating, which is provided with a great number of very small holes or orifices filled with crystalline sensitive salt. A part of the light projected on one side of the black filter passes through these orifices to the other side of the filter.

By appropriate means described below the electrons projected on the surface of the black filter (either from the photocathode, or by television cathodic beam) are concentrated or condensed on the extremely small grains of sensitive salt disseminated in the holes or orifices of the black filter, the total cross section of these grains of salt being very small in comparison with the surface of the black filter. A microfilm of crystalline sensitive salt is thus obtained, and on this microfilm a micro-image of opacities with strong shadow contrast is produced, the number of electrons necessary for this micro-image being many times smaller than in case of a continuous salt layer. By projecting a strong light through the black filter and the microfilm it contains, an image of great brightness, and of linear dimensions of the black filter can be obtained on the other side of the filter.

The invention has two principal objects:

One is the intensification of images of low brightness, and in particular, the vision (or photograph) of images through the darkness of the night.

The other is the simplification of television reproducing tubes and amplification of brilliancy and dimensions of television images.

The same method of intensification through the black filter is at the basis of these two solutions which will be successively described below.

To make it possible to achieve clear and sharp vision with a very weak light, or at night, the invisible, or very feebly lighted image, with its succession of variations in time, is projected, for instance by means of an appropriate lens, onto a semitransparent photocathode, placed in a vacuum tube, the photocathode being able to liberate electrons in a number proportionate, at each point, to the incident luminous intensity.

The black filter is formed by an electrically insulating plate or layer of material that is completely opaque. This plate or layer, deposited on a transparent anode, contains a multitude of pores, ducts, or orifices of appropriate profile extending through it comprising very fine constrictions such that the total cross-sectional area of the constrictions (located in the middle plane of the filter or preferably forming an outlet toward the anode) is extremely small in relation to the total surface area of the filter. The filter is completely impregnated with a continuity of sensitive salt crystals, which fill the ducts and form generally on the side turned toward the cathode, a quasi-continuous crystalline layer of large surface area.

The electronic image, emitted by the photocathode, is projected on and into this continuous salt surface covering the filter, forming in this layer a negative opacity image (or colored center image). Because of the small number of the projected electrons, these opacities are negligible, and this opacity image is absolutely imperceptible.

Under the action of the electric field (applied as aforesaid), the electrons forming the invisible image penetrate through the salt, into the multitude of very small constrictions or ducts of the filter, and form in these constrictions, before disappearing into the anode, concentrations and very condensed gatherings of electrons and opacity-centers. In the totality of the said constrictions (or ducts), filled with salt, there are thus formed heavy opacities, perfectly perceptible, which are able, through strong absorption of light, to form intense and visible shadow contrasts.

Thus is formed, in and by the totality of these salt points, a small opacity image, faithfully reproducing, point by point, the initial electronic image.

The totality of the salt constrictions (ducts) with their opacities continuously varying as a function of the variations of the images striking the photocathode, will be called as mentioned, "the microfilm," for by juxtaposing the constrictions of the salt there would be obtained an extremely small film; and the image of this microfilm will be called, as mentioned, "the microimage" (or also "microfilm").

Thus, if we assume, as an example, a photocathode and a black filter of 100 cm.$^2$ surface area; the distance between the filter ducts to be 0.3 mm.; the constrictions of the ducts at 0.01 mm. diameter, (i. e., the ratio of the filter surface area to the totality of cross-sections of the constrictions to be approximately 1,000), we shall obtain a microfilm of a total surface area of 10 mm.$^2$, and a micro-image composed of approximately 100,000 points. (Section ratios up to 100,000, and microfilms of fractions of one mm.$^2$ could be obtained in black filters of a special construction, hereinafter described, and a number of points of the order of 200,000 could be achieved.)

The opacity micro-image thus obtained will have the apparent dimensions of the black film. This image can be made clearly visible, on the other side of the black film, by the projection of a strong light, a small (or a substantial) part of which will go through the filter by passing through the salt-filled constrictions or ducts. The brightness of this image can be greatly increased by means of a second black-filter system with much larger ducts, and this second system will at the same time transform the negative image into a positive one. (Whereas the first black filter has the object of intensifying the shadow contrasts of the image, so as to form a perceptible negative image.)

The micro-image can be projected onto a screen; or it is made visible by direct projection, for instance, onto a frosted glass applied on the black filter. Or else the projection of the microfilms will be made by ultraviolet light, with a layer of suitable fluorescent material behind the filter.

The invention provides that the intensification of the shadow contrasts through the black filter can be combined with a method by which the electrons emitted by the photocathode are multiplied in number by emission of secondary electrons.

The invention provides particularly for a special method, whereby the intensification of the electronic image is effected without distortion of the image, by interposing, between the photocathode and the anode, and parallel to them, a series of special screens for the emission of secondary electrons, maintained at progressively increasing potentials.

Such special image preservation screens are of very fine structure, composed mainly of grids of very fine wire, very close-meshed and covered with materials suited for secondary emission, for instance, beryllium, beryllium oxides and the like. Or else, in a similar manner, it is possible to use thin metal sheets or foil finely perforated. The screens should be as close to each other as possible.

An important variation consists in a system in which the successive electron emission screens are incorporated in a fine tubular structure guiding the electronic image, during its amplification, through a multitude of fine separate channels assuring the fidelity of the image.

The electronic image, intensified by the secondary-emission screens, can also be projected onto a homogeneous salt layer and will produce in this layer an image with much greater shadow contrasts than would be produced by the initial electronic image as previously described. But it is particularly important to combine the two shadow-intensifications, by means of the black filter, and by means of secondary electrons, by projecting the electronic image with secondary emission onto the black-filter salt. Thus will be obtained a shadow-intensification proportionate to the products of the two amplifications.

The invention provides for two different methods of producing the intensified image in the salt and for projecting light through these images. In one of them, the formation of the opacity image and the projection of light through this image are separated in time, in order to avoid the possibility that the projection light, which can also reach the cathode, might disturb the formation of the image. This method has an alternating character, being able to utilize a kind of alternating current.

In the other method, the photocathode is protected from the projection light by a very thin sheet, non-transparent to light, but letting the electrons pass through it. The procedure becomes continuous, as the projections of electrons onto the salt and the projection of light through the salt can be made continuous and coincident in time.

Another important variation provides that the black filter is heated and the electrons enter the salt ducts through the intermediary of small metal areas.

Provision is made that the method of intensification, by black filter, of the luminous effects of the electrons may be used not only in the case of formation of an "electronic image," properly called, but also for any electronic current, whether it forms an "image" or remains a simple electronic current. Thus it is provided that the black filter may be placed, facing the photocathode, in the bulb of a photoelectric cell, and that the variations of the microfilm, formed in the salt, be projected, by means of a light, onto a second photoelectric cell, the current of which can thus be amplified.

As previously mentioned it is also provided to use amplification by means of the black filter not only in the case where the electronic image is originated by a photocathode, but also in the case where it is formed by the scanning of a cathodic beam, for instance, in a cathodic oscillograph; and more particularly for the case of a cathodic television tube.

In the case of cathodic oscillograph and television tube, the black filter may be set in the place of the fluorescent screen. The microimage, formed by the scanning cathodic beam, will be made visible by the projection of light through the microfilm, and can be observed directly (for instance on a plate of frosted glass, applied to the black filter), or can be projected onto a large screen. Ultra-violet light for projection through the microfilm on appropriate fluorescent screens can be used, as described. In order to receive directly a positive image the grid modulation of the electronic beam must be negative which can be effected by known means.

In the cases of cathodic tubes the diameter of the cathodic beam can be made preferably equal to, or of the order of, the distance between the orifices (ducts) of the black filter, so that at the moment of passage of the beam over the area belonging to an orifice, all the electrons of the electronic beam shall finally be concentrated on the very small section of crystalline salt filling the constriction. It is evident that by taking the section ratio of only 100 (for instance, diameter of the beam to be approximately 0.2 mm., and the diameter of the constrictions approximately 0.02 mm.) it will be possible to very considerably reduce the power (current and voltage) of the cathodic tube utilized, because only the very small power necessary to produce the micro-image will be needed. And at the same time it will be possible to project the microfilm directly onto a rather large screen, by means of ordinary light projection apparatus, and with essentially greater image brightness.

The invention also provides that the black filter, suitably suspended in a television tube, may be heated, with its microfilm of crystalline salt, to a high temperature, (for instance several hundred degrees C.) and this simply by the thermic radiation of the projection-light, because the black filter can actually absorb a great part of this radiation.

To make practical such heating—which would greatly accelerate the disappearance of the opacities and shorten the frame period—it is provided to arrange the black filter in a special manner, wherein the small crystalline salt columns or areas are more or less hermetically imprisoned by layers, or deposits, of a material which itself does not develop any vapour tension at these temperatures, such as silica or quartz, or possibly corundum; said deposits will prevent any distillation of the heated salt. (Under these conditions the microfilm may even be periodically subjected, after suitable overheating, to a recrystallization, and this recrystallization could eventually be effected under the action of supersonic or sonic high frequency mechanical oscillations, with a view to increasing the fineness of the crystals.)

During the projection of the microfilm, a combined application of heat and of super-sounds may take place, the heating being effected by radiation or any other process.

The invention provides also that in cases when the black filter is maintained at high temperature, the electrons of the beam are projected directly not into the sensible salt, but on small thin transparent metallic areas mutually insulated from each other, and covering the black filter as a regular mosaic, each such small metallic area being in contact with the salt of the corresponding constricted duct, the metallic area being much greater than the section of the ducts. In the condition of high temperature the electronic charges produced in such area by the beam, penetrate directly in the salt through the metallic contact, in the form of electrons forming opacity centers.

The invention generally provides extensive means for increasing the proportion of projected light penetrating through the black filter, at a given section of the ducts. For this purpose a multiplicity of small light condensing elements, concentrating optically the light on the constricted part of the ducts, are provided at the entry side of the black filter.

In filters maintained at ordinary temperature these concentrating elements are formed from crystalline salt, and both light and electrons are concentrated in traversing these elements. But in the special case of heated filter and electron concentration through small transparent metallic area, the light concentrating elements can be made also, for instance, of glass covered on its surface with a transparent metallic layer, the light being concentrated on the salt duct through the glass element, and the electrons being concentrated in the salt of the ducts by traversing the metallic layer, covering and surrounding the glass element, this metallic layer being in direct contact with the salt of the ducts.

On the other side of the filter (exit side) a transparent multicellular optical system may be provided, to concentrate the light coming from the ducts in the direction of the projection screen of larger dimension, taking advantage of the fact that the light after having traversed the filter constitutes a multiplicity of small luminous points, or punctual sources, composing the microfilm. A much greater brightness of the screen image can thus be obtained, than in the case of a fluorescent screen giving only diffuse light not suitable for such concentration and direction.

The invention contemplates also the use of electronic concentration produced by the black filter for control of light valves and specially of television light valves of different other kinds and particularly of light valves with a liquid containing a suspension of small discoidal particles orientable by an electric field produced and controlled by an electronic television beam. In these cases, for the sensible crystalline salt is substituted the liquid containing the above suspension. This liquid, as below described, will fill the small ducts or preferably will be used in a continuous thin layer.

Practical embodiments of the invention are shown in the accompanying drawings, in which.

Figures 1, 2, 3, 4, 4A, 5, 6:
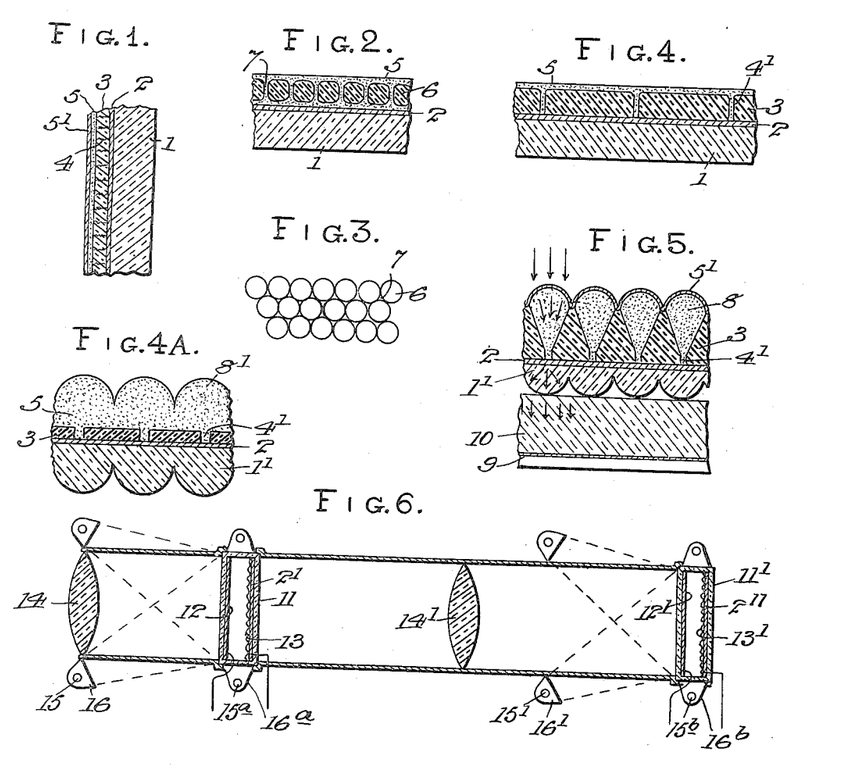
Figs. 1, 2 and 4 represent detail sections through different forms of black filters.
Fig. 3 illustrates diagrammatically a step in the production of a black filter.
Fig. 4A represents a section through a form of filter in which the front and back surfaces are specially shaped.
Fig. 5 represents a section through another form of filter combined with a sensitive screen.
Figs. 6, 7 and 8 represent longitudinal sections through cathodic apparatus in which black filters are incorporated.

Referring to the drawings,

Fig. 1 shows a black filter composed of a material which is itself completely opaque, but contains a multitude of pores, channels or ducts, traversing the material generally perpendicular to its surfaces through which a small part of the light can pass from side to side.

This figure shows a transparent glass support 1, a very thin metallic layer 2, transparent to light and serving as anode, the opaque material 3 of the filter, provided with the pores, channels, or narrowed ducts 4, filled with a continuity of sensitive crystalline salt; 5 is a thin crystalline layer of the same salt, and 5' is a very thin metallic layer, transparent to light and to electrons, which can serve as an intermediate cathode, supplying a desired difference of potential between it and the anode, to ensure rapid passage of the electrons through the salt. This layer is optional, and the electrons, striking the salt, can themselves create the necessary field.

This black filter is preferably made coarse-grained and with short channels, permitting a possible maximum of light to pass.

Fig. 2 shows, greatly enlarged, a black filter comprising a single layer of grains. It can be made, for instance, by placing, on a transparent support (for instance, of quartz), a uniform (regular) layer, formed by juxtaposition of small black glass, or black enamel, spheres or balls, as shown in Fig. 3. By subjecting this layer to suitable pressure and heating it to a temperature close to that of softening, it is possible to reduce the interstices 7 to as small a size as desired, thus achieving the above cited ratios between the cross-sections. This operation can be effected, while keeping control of (or checking) the light passing through the system, for instance by exerting pressure by means of transparent quartz plates. Present technique permits producing small calibrated glass balls up to 0.1 mm. diameter which is amply sufficient.

Fig. 4 shows a black filter constituted by a layer or plate 3 of a completely opaque material, (for instance, glass or enamel) with small perforations 4' filled with crystalline salt, in contact with the transparent anode 2, and the salt layer 5.

In the black filter of Fig. 4 the electrons projected on the salt surface 5, are concentrated in channels 4', upon traversing the corresponding areas of the layer 5. A great part of the light projected on the surface 5 is lost and cannot traverse the channels.

In Fig. 4A the crystalline salt layer 5 is of much greater thickness in order to permit a better distribution in the salt of the electric field driving the electrons towards the small ducts 4'.

At the same time the surface of the layer 5 is shaped in a form of a multiplicity of juxtaposed bulbs or lenses 8' of appropriate curvature, calculated so as to concentrate optically on the small ducts 4' a great part of the light falling in approximately normal direction on the filter. The distribution of these light concentrating bulbs is such that each of them concentrates the light on the corresponding duct; 2 is the transparent anode, in contact with the salt of the ducts 4'.

In the filter of Fig. 5 the electron concentration takes place through the cones 8, traversed by the electrons. A great part of the light projected on the surface of the cones can be condensed optically, by the bulbs of the cones 8, on channels 4' and can go by these channels through the filter. In order to increase the concentration of light the surface of opaque material 3 forming the walls of the cones can be covered, by known methods, (before depositing the crystalline salt layer) with a discontinuous, electrically non-conducting mosaic of very small light-reflecting metallic grains.

In Figs. 4A and 5—1' is a support of transparent material (for instance glass or quartz) of a special form. The exterior surface of this support is shaped in a multitude of juxtaposed hemispheres, directing the divergent light, coming from the small points of channels 4', in nearly parallelly directed beams, which can be projected with much less loss on a screen. The plate 1', which can be called light rectifier, permits also as shown in Fig. 5 to project the image without disturbance for instance on a photographic plate, or film, or moving film 9, through a relatively thick glass wall 10 of the vacuum camera of the device.

If desired, the light rectifying plate 1' can be made of the same salt, and the anodic layer 2 could be placed on the bulb-shaped surface of plate 1'.

The surfaces of the cones 8 of Fig. 5 (and also the bulbs 8' in Fig. 4A) may be covered with a thin metallic layer 5' transparent to light and forming an intermediary cathode.

Taking into consideration that in medium fineness filters the distances between the small ducts can be of the order of 0.2 to 0.3 mm., and in coarse filters of large size, this distance may reach or exceed 0.5 mm., it is possible to form in the surface of the salt filling the cones, (or the surface of the thick salt layer in Fig. 4A) by means of appropriate mandrels, a multitude of juxtaposed and conveniently shaped small cavitations.

Or the filter channels, for instance these shown in Fig. 4, can be fashioned, starting with large channels or openings in the black enamel or black glass layer, and these channels can be progressively narrowed, under appropriate optical control, by pressure at a temperature close to that of softening of the layer's material. These relatively large initial openings can also, if necessary, be made by a photoengraving process (for instance the potassium bichromate process), etching out the tiny bare (uncovered) areas with hydrofluoric acid, etc. The small openings can also be made in this manner.

The black filter can also be made of metal, the surface of which, including channels, is protected by a thin, non-transparent insulation layer.

The complete black filter composed from the opaque material 3, the channels 4 filled with salt and, if desired, the layer 5', will be shown as a single element 13, wherever necessary in subsequent figures.

Fig. 6 shows diagrammatically in sectional view the reproduction and projection of an image with the aid of a photocathode and a screen of a sensitive salt, in the case of an alternating procedure.

In this figure, 11 denotes a glass capsule with a very high vacuum; 12 is a semitransparent photocathode, composed, for instance, of a thin layer of caesium and silver, suitably oxidised and deposited on glass; 2' is a very thin metal layer (for instance, of silver) transparent to light, deposited on glass and generally forming an anode; 13 is the black filter; 14 is a lens or objective through which an image to be amplified, for instance, a viewed object, is projected on the photocathode 12; 15 is a circular source of light for projection, for instance, in the form of a tube with a rarified gas under an electric discharge. The light of this tube is disposed, for instance, circularly around the objective and projected by a circular reflector 16 on the black filter through the semitransparent layer 2' constituting the photocathode.

15$^a$ is another circular source of light, and 16$^a$ its corresponding reflector, injecting the light in the space between the photocathode and the black filter. This light is partially reflected from the photocathode on the black filter. These two sources may be lighted simultaneously or either one can be suppressed.

The operation consists at least of two phases, I and II, alternately succeeding each other.

In phase I, a high difference of electric potential is applied between the conductive layer 12 forming a cathode, and the conductive layer 2' forming an anode. During this phase, the exterior image to be amplified is projected by the objective 14 on and through the photocathode, forming a so called electronic image at each point of which the number of electrons is proportional to the intensity of the incident light. Under action of a high electric potential applied between 12 and 2', these electrons are projected on and into the sensitive salt of the black filter 13 and traverse the salt for final disappearance in the anode 2'.

After a time sufficient for the formation in the black filter of a negative image of opacities, begins phase II: the difference of potential between 2' and 12 is suppressed and, as a result, the centers of opacity forming the negative image in the salt are immobilized approximately in their positions and distribution. The image formed on 13 remains immovable during a few moments. Simultaneously with the suppression of the potential, the light of projection is lighted at 15. This light, passing through the photosensible layer 12, causes emission of numerous electrons. In the absence of an electric field, however, these electrons will not be projected on the crystalline layer, and will not penetrate the same so that they will not change the distribution of the electrons and will not modify the image.

Preferably, and in order to create a continuous visual impression the complete period of the alternating procedure may be equal to ⅟₂₅ sec.

In the reestablishment of the phase I (after the end of the phase II), i. e. after suppression of the light at 15 and establishment of the electric field between 12 and 2', the old image previously immobilized during phase II, is imparted an apparent movement and disappears, the electrons with their old distribution, reaching the anode 2', and new electrons coming from the photocathode 12 will progressively form a new image in the black filter. And so forth.

The negative and reversed image on the black filter 13, illuminated or projected by the light at 15, can be, if desired, reversed and rendered positive by any known method.

It is particularly provided to transform this negative image into a positive image, and to straighten it out, by projecting the image at 13 through the lens 14' on a second transparent photocathode 12', in front of which is a second black filter 13' in contact with the anode 2'' within a container 11' with high vacuum similar to the container 11. The image of opacity thus formed in the black filter 13' will be positive and straight and can be directly observed, or projected on a screen either by the light 15' and reflector 16' or by any other source of light and system of projection.

It is also provided that the projection light can be projected on the second black filter simultaneously with the light from 15' by a circular source 15$^b$, the reflector 16$^b$ injecting this light in the space between photocathode 12' and the black filter. Either one of these sources may be sufficient.

It is also provided that the described system may operate with three phases, periodically alternating as follows:

*Phase I'*.—Potential applied between 12 and 2' (12 serves as cathode); light 15 is out; 15' also out; potential between 12' and 2'' either indifferent or zero.

*Phase II'*.—Potential between 12 and 2' reversed (12 will be an anode); 15-illuminated, 15' is out; potential between 12' and 2'' applied (12' is a cathode).

*Phase III'*.—Potential between 12 and 2' is inverted (12 is now the anode) 15 is extinguished, 15' lighted; potential between 12' and 2'' is inveted (12 is an anode).

The operation of the three phases has an advantage in that, while 12′ and 2″ are strongly illuminated by the light 15′, a portion of this light which could be reflected and reach the rear of the photosensitive layer 12, could not activate the crystalline layer 13, the potential between 12 and 2′ being during these periods (phase III′) reversed.

The coordination in time between the application of potentials and the illumination of the respective light sources can be easily assured by known means.

Figure 7:
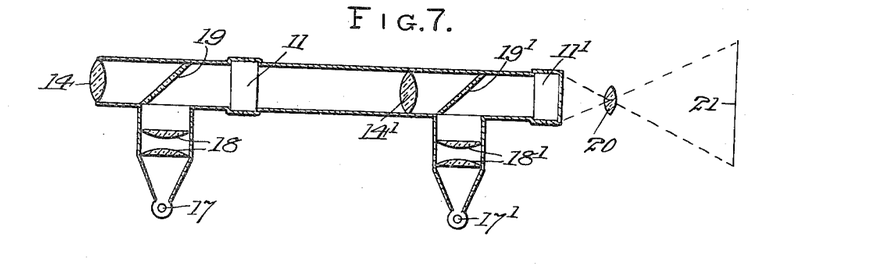

Fig. 7 shows a modification in which the systems of projection of light by the tubes 15 and 15′ (with their respective reflectors 16 and 16′) are replaced respectively by the luminous sources 17 and 17′, lenses 18 and 18′, and mirrors (semi-transparent) 19 and 19′.

In Fig. 7 it can be seen that the positive image produced in the black filter of 11′ is projected by the projection system 17′, 18′ and 19′ through lenses 20 on the large screen 21.

If the original image was in infra-red light, then not only a visible image will be obtained, but also with greatly increased brightness.

In a modification of the black filter, called with a "capacity current," a fine layer of insulation is introduced between the exit of the channel and the anode. This layer can be, for instance, of glass or of a very thin mica, of the order, for instance, of .01 mm. in thickness. The electrons become accumulated under action of the electric field in the salt of the straight channels, and especially on the face of the anode, not being able to come from the channel toward the anode. In this case, after the projection of the microfilm is achieved, the evacuation of the electrons from the salt is produced by applying a strong inverted potential which will drive the electrons, concentrated in the narrow channels, toward the large surface of the salt. To make possible their emergence from the salt, the latter is covered by separate grains or mosaic of photosensible elements such as caesium, which loses an abundance of electrons under action of the strong projection light.

Figure 8:
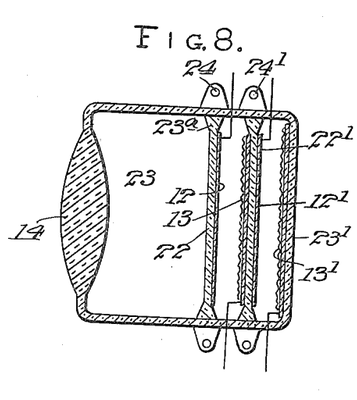

Fig. 8 shows a modification of the process, in which the projection of light on the black filter, after formation of the image of opacities, is effected by a special flat disc 22, for instance, of glass containing light diffusing particles and strongly illuminated on all its parts by a light projected in it through its periphery (according to known methods); in this figure, 23 is a glass chamber with high vacuum; 14 is an objective, projecting the image on the photocathode 12 deposited on the disc 22. The disc 22 is rendered luminous by the peripheral illumination, according to known methods, by the light of the circular tube 24. The light enters this disc through its peripheral thickness 23ᵃ. A second similar disc 22′ lighted by the source 24′, supports, at one side the black filter 13, and the other side the second photocathode 12′. 13′ is the second black filter, supported by a separate plate, or by a wall 23′ of the chamber. The operation is the same as was explained for Fig. 6.

Figure 9:
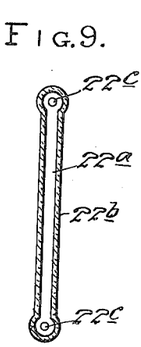
Fig. 9 represents a section through a light projecting disc.

Fig. 9 shows a variation of a light projecting disc comprising a flat capacity 22ᵃ filled with rarefied gas and limited by the walls 22ᵇ. The gas disc 22ᵃ is strongly illuminated by electric discharges introduced by two separate electrodes 22ᶜ.

As previously stated, it is provided, in order to increase the sensitiveness of the system, to multiply, by means of secondary electrons, the number of the electrons projected onto the black filter, as compared to the electrons originally emitted by the photocathode. Such a multiplication can be obtained by placing corresponding amplification devices between the photocathode and the black filter (for instance in Fig. 8), and by sending a peripheric light projection into the space between electron multiplying device and the black filter.

But the most important results can be obtained by combining the multiplying device with the continuous method of image intensification.

Figure 10:
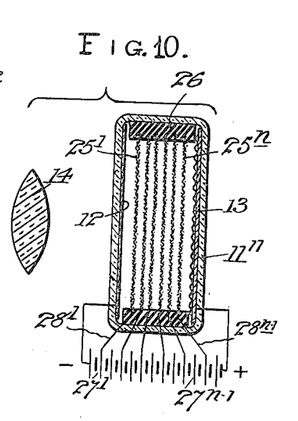
Figs. 10 and 11 represent sections through secondary electron amplification systems.
Figures 11, 11A:
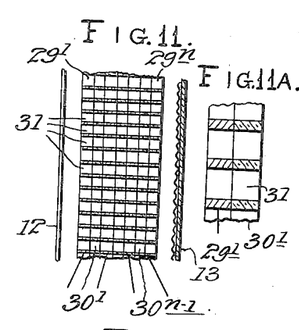
Fig. 11A represents an enlarged detail section of part of Fig. 11.
Figure 12:
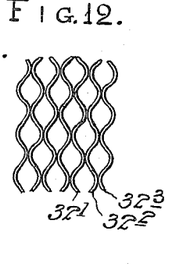
Fig. 12 represents an enlarged end elevation of a modified form of electron multiplier.

Figs. 10, 11, and 12 show the image amplification system by secondary electrons.

Fig. 10 shows schematically an arrangement for intensifying the electronic image by a multiplication of the secondary electrons, by means of very fine mesh grids, inserted between the photocathode 12 and the transparent anode of the black filter 13.

In this figure, $25'-25^n$ are fine metallic grids, for instance of metal wire, covered with a material (such as beryllium oxide or the like) that is able to emit secondary electrons. Said grids are set, for instance, in a supporting ring 26 of insulation, and are insulated in regard to each other. A progressively increasing difference of voltage, schematically indicated by batteries $27'-27^{n-1}$, is applied between these grids by means of electrodes $28'-28^{n-1}$. An appropriate difference of potential is also applied between the photocathode 12 and the grid 25′, as well as between grid 25″ and the anode of the filter 13. The direction of the electric field between the photocathode and anode is the same through all the grids. 11″ is the wall of the hermetic glass case, inside which a high vacuum prevails, and 14 is the lens which concentrates the image on the photocathode 12. The light can be projected by one of the previously described means.

In order to avoid deformation of the image, the distance between the grids $25'-25^n$ is preferably made as short as is possible and compatible with the applied difference of potential. The distances between the grids and the cathode, as well as the anode, are likewise made small.

Fig. 11 shows a secondary electron producing device composed of a succession of finely perforated sheets with secondary emission material deposited on the surface of the perforations, and of similarly perforated sheets or laminae of insulating material inserted between the first named sheets, forming together channels guiding the electrons. In this figure $29'-29^n$ are the perforated sheets with secondary emission material; $30'-30^{n-1}$ are similarly perforated insulating laminae; 31 are channels guiding the electrons. The interior surface of each channel is thus composed of an alternating succession of rings of secondary emission material and of insulating material.

Figure 13:
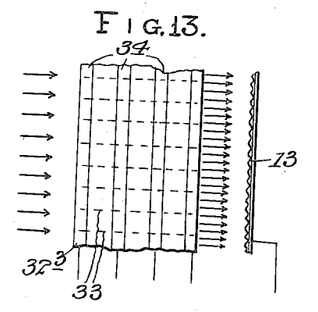
Fig. 13 represents a side elevation of the multiplier shown in Fig. 12.

In an important variation shown in Fig. 12 the channels are constituted by mutual application of thin undulated laminae $32'$, $32^2$, $32^3$, etc. of insulating material, preferably of glass, the channels being parallel to, and formed by the undulations. Fig. 13 shows the surface of such an undulated lamina, for instance $32^3$, oriented to $32^2$; 33 are the lines of contact between the undulations $32^2$ and $32^3$; and narrow bands of secondary emission material 34 are deposited on the surface of the laminae on both sides, with appropriate distances between the bands. The thin undulated laminae are preferably of very thin glass, the thickness of which can be of the order, for instance, of 0.01 mm.; the dimension of the undulations and of the channels can be of the order, for instance of 0.1–0.2 mm. in diameter, and can thus intensify electronic images of very fine structure with a very great number of points. The bands 34 deposited on different undulated laminae at the same distance from front and back edges are in mutual contact when the laminae are assembled and are at the same potential.

Figure 14:
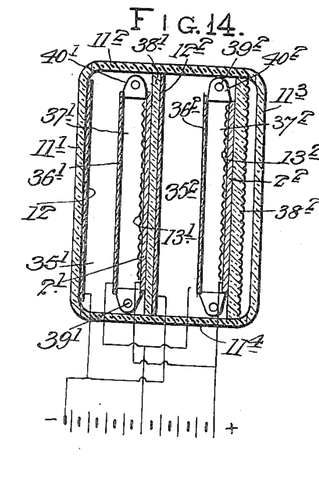
Figs. 14 and 15 represent sections through twin or tandem arrangements of cathodic apparatus.

Fig. 14 represents the case in which the formation of the opacity image and the projection of light through this image are not separated in time, but are continuous and synchronous. This is generally achieved by placing a nontransparent screen between the photocathode and the black filter. This screen permits the electrons, having sufficient speed, to pass through. In this case the light does not pass through the photocathode but is projected from the periphery into the space between the nontransparent screen and the black filter and penetrates more or less obliquely into crystalline layer. Consequently, at no time can any part of said light fall on the photocathode and disturb the electronic image produced by same.

The screen preferably consists of an extremely thin glass lamina on which a thin layer of metallic lithium is deposited (for instance, by vaporization in vacuum), the thickness of this layer being just sufficient to assure its non-transparency for light.

In order to avoid or reduce the possible fluoresence of the metallic layer under the action of incident electrons, the difference of electric potential applied between the photocathode and the protecting screen will be reduced approximately to the value strictly necessary to assure the penetration of the electrons through the screen while losing the greater part of their kinetic energy. (In contrast to the case of a fluorescent screen, where great electron velocities are needed, the penetration of electrons into the crystalline salt layer requires only small velocities.)

For the same purpose of avoiding the fluorescence of the protecting screen when secondary electron producing devices are installed between the photocathode and the black filter, the protecting screen will preferably be inserted between the photocathode and the secondary electron producing device (for instance, at the entry of this device). Thus the danger of fluorescent trouble will be limited to the action of only primary electrons in relatively low number.

Fig. 14 shows schematically, in cross section, a double (twin) arrangement, with two compartments, dark and light.

In this figure $11'$—$11^4$ are the glass walls of the holder containing 4 compartments; $35'$ is a dark compartment one end of which is formed by the photocathode $12$ deposited on the transparent wall $11'$, and the other end by the non-transparent screen $36'$ with its support; the lateral walls $11^2$ and $11^4$ are of black non-transparent glass. $37'$ is the strongly lit compartment its ends formed by the nontransparent screen $36'$ and by the black filter $13'$. $2'$ is the transparent anode deposited on the very thin plate $38'$ of mica, or transparent or frosted glass, $39'$ is a circular peripheral source of intense light; $40'$ is a reflector.

Juxtaposed to this two-compartment arrangement is a second similar system with two compartments, $35^2$ (dark compartment) and $37^2$ (light compartment), said system, as explained, transforming the negative image into a positive image. In case a second black filter is used, this second system produces a second luminous intensification of the image. This second system comprises the same thin glass sheet $38'$, the right side of which is covered by the semitransparent cathode $12^2$; the non-transparent screen $36^2$; the black filter $13^2$; the anode $2^2$; the anode support $38^2$ (the anode may, if desired, be set directly on the wall $11^3$); $39^2$ is a source of light, similar to $29'$, lighting the compartment $37^2$; $40^2$ is a reflector. The thin transparent plate $38^2$, supporting the transparent anode and the black filter $13^2$, can be of glass the exterior surface of which is shaped as shown at $1'$ in Fig. 5, with a multitude of hemispheres.

Figure 15:
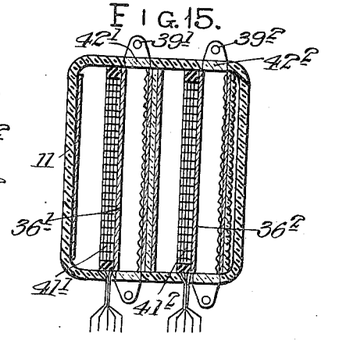

Fig. 15 represents schematically a variation of Fig. 14, wherein $41'$ and $41^2$ are already described (for instance, Fig. 13) arrangement for amplification of the electronic image by secondary electrons. The non-transparent screen $36'$ and $36^2$ can be supported by the last grid of the devices $41'$ and $41^2$. The light injectors $39'$, $39^2$ are exterior to the glass holder $11$, the light penetrating through the transparent parts $42'$, $42^2$.

The screens $36$, $36^2$ can be also composed of a very thin lamina or layer, for instance of aluminum, of a thickness of the order of 0.5 micron. But, as previously mentioned, it is particularly provided to make this layer of lithium or its alloys, of very low density, which will be more permeable to the electrons. The metallic screens $36'$ and $36^2$ will preferably be covered on their side facing the "light" compartment, with a very thin layer of glass or quartz, so as to avoid the liberation of photoelectrons by the action of the strong light; or this glass layer or lamina may form a very thin support for the non-transparent metallic deposit, forming the screen.

Figure 16:
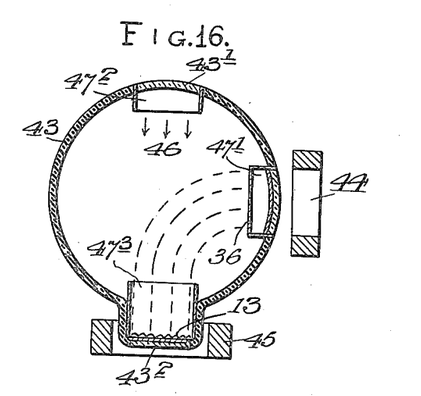
Fig. 16 represents a section through an apparatus in which the electronic projection is curved.

In order to simplify the projection of light through the crystalline layer and the black filter, provision is made for projecting the electronic image onto the crystalline layer and the black filter along curved trajectories produced, in accordance with known methods, by the action of an appropriate magnetic field on the electrons forming the image. The photocathode and the crystalline layer may form an angle between them, for instance of 90°, with the strong light being, in this case, projected vertically onto the crystalline layer of the black filter. Fig. 16 shows schematically an example of such an arrangement. In this figure, $12$ is a semitransparent photocathode, set inside the bulb $43$; $44$, $45$ are two permanent magnets in the form of rings, which cause the deviation of the electronic image; $13$ is the black filter, whereon the electronic image is projected. Arrows $46$ indicate the beam of light projected onto the crystalline layer and the black filter. Bulb $43$ is transparent in back of the photocathode $12$, as well as in its upper part $43'$ and its lower part $43^2$, in order to let pass the light beam $46$, on the black filter $13$. Tubular shields $47'$, $47^2$, $47^3$, may be provided to prevent light $46$ from reaching directly or by reflection, the photocathode $12$; in addition, a screen $36$, non-transparent to light, but letting pass the electrons, can protect the photocathode against the light. This screen should be kept at an appropriate potential between that of the photocathode and that of the anode.

In general the secondary emitting devices may be combined either with the black filter, as described hereinabove, or with a fluorescent screen.

Indeed, making use of the fact that the apparatus shown in Figs. 12 and 13, with secondary electrons, permits, because of its particular very fine structure, not only to intensify the electronic flux, but also to greatly intensify the electronic image as such, without deforming it, provision is made to project said intensified electronic image onto a fluorescent screen, sensible to electrons, and to obtain in this manner a visible intensified image.

Provision is also made to subsequently project this image of the fluorescent screen onto the photocathode of the above described system in order to effect further intensification of said image by means of the black filter system. This case is shown schematically in Fig. 17.

Figure 17:
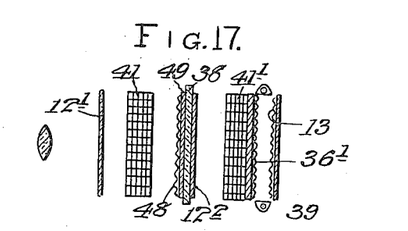
Figs. 17 and 18 represent sections through image intensifying systems.

In this figure, the electronic image of the photocathode 12' is intensified by the secondary emission system 41, and is projected on the fluorescent screen 49, the electrons first passing through a thin non-transparent metallic layer 48. The thin metallic layer 48, indicated by a zigzag line, constitutes at the same time both the anode and the screen protecting the photocathode 12' from the light of the fluorescent screen 49. The fluorescent light traversing the very thin plate 38 of glass or of mica, strikes the semitransparent photocathode 12², which produces a strongly intensified electronic image. This device 41' is projected on the black filter 13. The nontransparent screen 36' protects the photocathode 12² from the projection light of the peripheral source 39.

Figure 18:
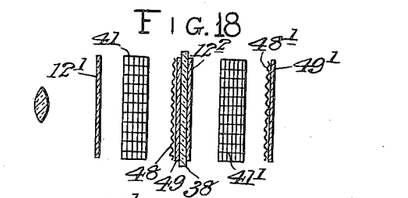

Fig. 18 shows a double intensification with two successive fluorescent screens, in which the black filter is replaced by the fluorescent screen 49', having as explained a light protecting layer 48'.

The double intensification systems shown in Figs. 14, 15, 17 and 18 have the advantage that the high potential differences between the photocathode and the anode (and the corresponding grids) can be applied in parallel, as shown on Fig. 14. In general and depending on the particular case, it is possible to combine different and various manners of intensification of the electronic image by the black filter (with or without amplification by secondary electrons) with its intensification by means of projection onto a fluorescent screen.

The invention also makes provision for a method to accelerate the disappearance of the opacity images (as well as to intensify said images) by the application to the sensitive crystalline salt layer of high, and very high, frequency elastic oscillations, in accordance with applicant's copending application, Serial No. 599,572, filed June 15, 1945.

This can be obtained, for instance, by using a plate of piezoelectric quartz with strong high frequency resonance oscillations as the support of the black filter.

The above described invention may have many different practical applications, including some that are listed as follows:

A. Direct clear vision, or direct clear projection onto a screen, at night or with very poor light (using either the remaining light of the sky or the stars, or else natural infra-red light).

Particularly, clear vision at night of the road, its surroundings, landscape, etc. during trips by car, boat, railroad, airplane, etc.

B. Taking of pictures, ordinary or cinematographic, or television, from an airplane at night.

Cameras or apparatus for night vision, of large linear dimensions, with large plastic lens and with black filters of large linear dimensions (for instance of several decimeters or more) could be produced relatively easily. They may form "windows" for clear vision of landscapes when travelling at night, for instance by boat. Or else they may project such nocturnal vision on large clear window-openings facing the obscurity of night (on boats, airplanes, etc.).

C. In general, suppressing the obscurity of night for man's vision, achieved not by external lighting, but by an artificial intensification of man's power of vision.

D. Ordinary photography, rapid or instantaneous, with poor light or at night.

E. Taking cinematographic pictures at greatly reduced lighting, or even at night, without light.

F. Taking television pictures in same condition of reduced lighting or at night.

G. Eventually astronomic photography with greatly reduced exposure.

When utilizing the black filter in cathodic oscillographs and in television tubes, a single black filter is generally used, preferably with a relatively moderate ratio of sections (for instance of the order of 100). Preferably the filter will be heated in order to accelerate the disappearance of the images, and the invention makes provision for special black filters that will be adapted to be maintained at a high temperature, which may reach or surpass 500° C. Other means of acceleration, such as ultra-sonics or infra-red rays, may be used instead of, or in addition to, the high temperatures.

Figure 19:
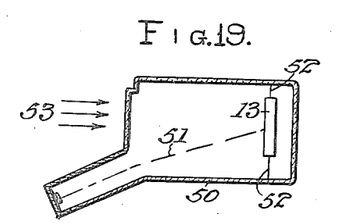
Fig. 19 represents, in section, a television tube having a black filter suspended therein.

Figure 19 shows such a black filter suspended in a television tube and heated for instance by the radiation of the source of projection.

In this figure, 50 is the television tube; 51 its cathodic scanning beam; 13 is the black filter, suitably suspended in the vacuum by the supports 52, so as to reduce to a minimum heat losses due to conductivity; arrows 53 denote the projection light, projected onto the filter (in the majority of cases, on the side of the cathodic beam). The intensity of the radiation of the source, principally the infra-red radiation, absorbed by the black filter, is sufficient to compensate the thermic losses of the filter, due to the radiation in the vacuum, for instance up to 500° C. The temperature of the black filter may be regulated, by regulating the absorption of the infra-red radiation of the source by suitable screens, or by a screen with water circulation interposed between the source and the television tube. The filter may be automatically maintained at a constant temperature, by known means, through an automatic variation of the thickness of the absorption-layer as a function of the radiation of the black filter. The electric assembly diagram of such a tube is known.

Figure 20:
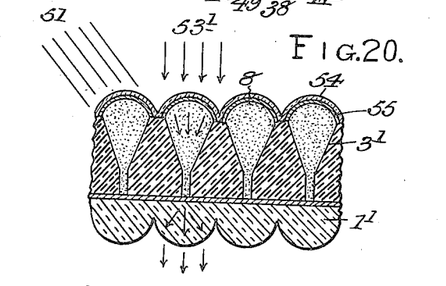
Fig. 20 represents, on an enlarged scale, a section through the filter of Fig. 19.

Fig. 20 shows, greatly magnified, a part of the black filter, similar to the one shown on Fig. 5; the convex surfaces of the salt cones are covered by a very thin transparent quartz or silica layer or film 54, its thickness being of the order for instance of micron, or fraction of a micron, said layer or film letting pass through it the electrons projected onto it. A continuous metallic layer 55, also extremely thin and transparent both to electrons and to light, may optionally be interposed between the salt and the quartz layer, in order to form an intermediate cathode. The quartz and the metal layers are deposited preferably by vaporization in vacuum. Preferably, the quartz layer is deposited so as to adhere, around the conical passages 3' to the opaque material of the filter. Due to the protective layer 54, the crystalline salt 3 even when heated to a temperature of 500° C., and above, cannot undergo any vaporization or distillation in the vacuum. The thickness of the salt layer remains constant, as does also its shape. An even greater advantage is the fact that high vacuum may be maintained in the television tube even at the highest temperatures of the salt. (A thin layer of metal, transparent to light, could contribute very little to this tight condition). The support 1' of the filter should also be of quartz or of glass covered with quartz, and can be shaped as in Fig. 5. Other forms of black filter could also be hermetically protected in this way. The arrows 53' show the path of the light.

It is known that if crystalline salt and a metallic electrode, which is in direct contact with it, are maintained at a high temperature, for instance, of the order of several hundred degrees C., the electrons can, under the action of a suitable electric field, pass directly from the metalli electrode into the salt and form in that salt opacity centers.

Figure 21:
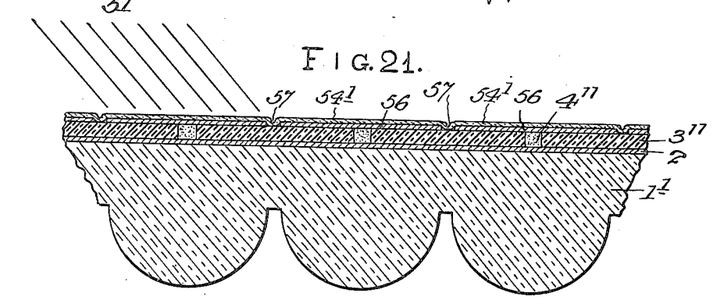
Fig. 21 represents, on a greatly enlarged scale, a section through a modified form of filter.

The invention makes use of this fact to make provision for an important variation of the black filter maintained at high temperature, wherein the electrons, instead of being projected directly into the salt, are projected onto the metallic electrodes and then enter the salt through the intermediary of said electrodes. This method is called "method with intermediary electrodes" and such a filter is shown in Fig. 21. In this figure, 3'' is a thin sheet or layer of insulating opaque material, containing a multitude of orifices, perforations, or narrowing ducts 4'' filled with crystalline salt; 2 is the anode; 1' is a support made of glass or quartz. The surface of the filter (including the surface area of the ducts 4'') scanned by the cathodic beam 51 is covered by a thin metallic layer. But this layer is a discontinuous one and is composed of as many thin metallic pieces 56, electrically insulated from each other, as there are ducts or passages 4'' in the filter.

The said metallic pieces, or areas, have linear dimensions much larger than those of the ducts or passages, and each such metallic piece is in direct contact with the salt of the corresponding duct which the said metallic piece covers. These small metallic areas, cover almost the whole of the filter (except for the very fine separation lines 57, which are bare of metal), and the ratio between the totality of the surfaces of the metallic pieces and that of the minimal-sections of the ducts may be the same as the aforecited ratios between the filter surface and that of the ducts. The filter will preferably be covered with the thin protective layer 54' of quartz, allowing to pass electrons and light. Said protective layer 54' should be continuous and will preferably adhere to the opaque material 3'' of the filter, along the lines 57, thus insulating the metal pieces one from another. The cathodic beam 51 will preferably have a cross-section approximating the surface area of one of said metal pieces. The thickness of the metal deposit of said small areas 56, above the salt of the ducts 4'' and in contact with the salt, is sufficiently small to allow light to pass. On other parts of the filter the thickness may, if necessary, be greater.

The electrons of beam 51 enter the metallic area 56 which is in contact with the beam, pass through the metal in the form of an electric current, to the point of contact with the salt, and enter heavily condensed into the salt, under the action of the temperature, and of the electric field. This field is created by the presence of the electrons of the beam between the metallic areas and the anode.

Figure 22:
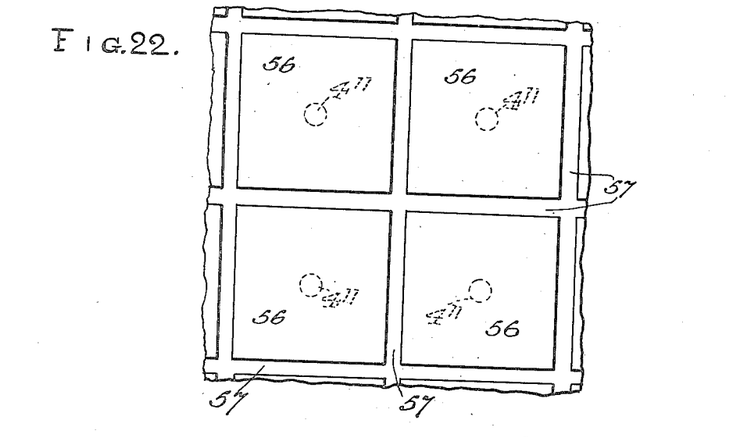
Fig. 22 represents a section through another modified form of a black filter.

Fig. 22 shows a plan view of the filter of Fig. 21, with the covering layer 54' removed or absent. 4'' are the small squares of metallic deposits; and 57 are the lines of separation and insulation between the metallic area-pieces. These lines may be produced by a fine tool or by means of a photogravure, as suggested.

The opacities thus produced by the scanning beam in the salt of the black filter, reproduce faithfully, in the microfilm of the salt, the television image. All electrons of the electronic beam, falling on a metal area piece, are immediately concentrated on the corresponding point of the microfilm of salt.

This method of concentration of electrons in the grains of salt by means of "intermediate electrodes" has, in relation to the previously described method, the great advantage that the electrons, in order to concentrate in the final ducts, need not pass through the above described cones or layers of the salt, but penetrate directly, already concentrated, into the tiny part of the salt which is really useful, where the microimage is formed and the microfilm, properly called, takes form. Thus one gets rid of the cumbersome and unnecessary parts of the salt. This method also eliminates the parasitic time of the passage of the electrons through the cones and concentration zones, leading to the narrowed ducts, and the parasitic high voltages necessary for these passages. These voltages may here be used to intensify the useful field in the ducts. At the same time the filter construction is simplified and it is possible to use filters and salt layers of much smaller thickness.

The black filter of Figs. 21 and 22 gives passage only to a small part of the projected light. But in an important modification light concentrating elements (such as lenses, spheres or cones) covered with a very thin metallic layer transparent for light are incorporated in the black filter. These elements, on one hand, concentrate optically the projected light on the small grains of sensible salt constituting the microfilm of the black filter; and, on the other hand, concentrate the projected electrons on the same grains of salt by conducing them into these grains by metallic conductivity of the respective transparent layers covering the concentrating elements.

Figure 23:
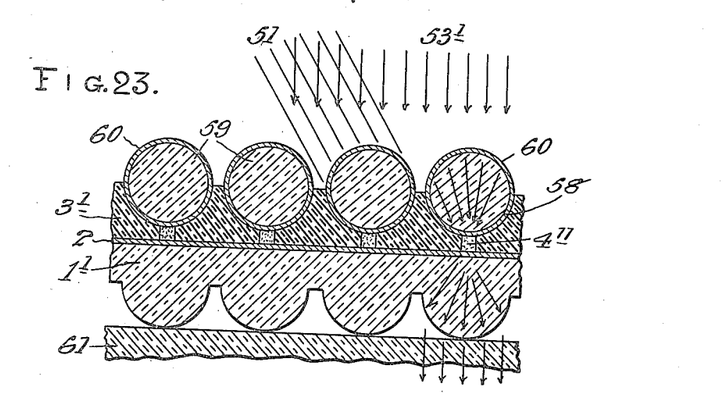

An example of such a black filter is shown in Fig. 23, in cross-section through a few elements.

In this figure, 1' is a light rectifying transparent support of the black filter; 3', the opaque material of the black filter shaped in the form of a multitude of concavities 58; 4'' are small orifices, filled with salt, in the bottom of these concavities; 59, transparent spheres, for instance of glass, fixed in the concavities 58; 60, a transparent metallic layer deposited on the spheres; 51 are lines indicating the scanning beam of the television tube; 53', the arrows indicating the light projected on the black filter.

One of the possible modes for construction of this filter is the following:

The black body 3' of the filter is shaped from glass or enamel plate by a mandrel complementary to that used for shaping the glass plate 1'. The known technique can realize calibrated glass spheres to a diameter of 0.1 mm. After having applied the layer 60 to the spheres and having introduced and fixed the spheres into the concavities, the crystalline salt layer is deposited, by distillation, on the side oriented to the anode. The salt penetrates through the orifices 4" until the metallic layers 60, and assures electric contact with the spheres 59.

The excess of salt deposit on the surface of 3' can be taken away, but that is not obligatory. After that, the anodic layer 2 is deposited on the surface of 3', including the salt in 4", or on the crystalline salt layer if it is not taken away. The glass body 1' is then applied, or sealed, to the anodic layer 2. A solid transparent plate 61 can support the whole. Naturally the metallic layers of the spheres remain electrically isolated from each other.

In this black filter a relatively great part of the projected light can go through the filter, and can conserve approximately its direction after passing the filter. It is important to note that, as a result of such optical concentration of light on the small grains of salt, these grains, if desired, can be strongly heated and maintained at a higher temperature than the rest of the filter. This heating can be regulated by controlling the admission of thermic infra-red radiation. Also such concentration can make more effective the possible extinction of images by infra-red radiation. By appropriate modification of the technique it is possible to use salt spheres instead of glass spheres.

Figure 24:
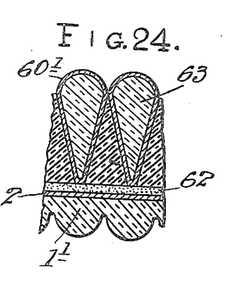
Figs. 24 and 25 represent detail sections of particular forms of electron-concentrating ducts.

Fig. 24 shows a variation in which the light concentrating bodies are not spheres but cones, coated on their surface with thin transparent metallic layers 60'. These cones can be of glass, quartz, or of the same crystalline salt.

In Fig. 24 is shown that a continuous crystalline layer 62 of salt can be used, this layer being in contact with the transparent but metallized ends of the cones 63.

This form has the advantage that the strong concentration of electric charges on the needle-shaped ends of the cones can assure the transfer of electrons from the metal into the salt at much lower temperature, and even at ordinary temperature if a sufficiently high voltage is used.

The invention provides also that in the above described cases of electronic concentration through "intermediary electrodes" the high voltage current of the electronic beam can be used to heat the salt grains and to maintain them at much higher temperature than the rest of the filter.

The index of refraction of the glass spheres or cones will be chosen so as to concentrate the greatest possible part of the light on the salt grains in contact with the spheres on the opposite sides or with the ends of the cones.

Empty reflexion cones or pyramids provided in the opaque material and metallized on the interior side can also be used for partial concentration and direction of light but with much lower efficiency.

Figure 25:
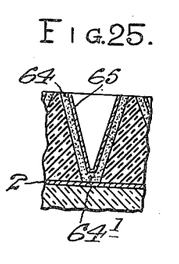

In cases of black filters with very fine orifices not realizable with other methods it is provided to make greater orifices and to then reduce their diameter to the desired fineness by progressive deposit (for instance by vaporization in vacuum) of insulating non-transparent material or composition. This method can also be used for the formation of crystalline salt grains, as shown in Fig. 25, where a salt layer 64 is deposited on the interior surface of the cone 65, this deposit forming on the end of the cone the crystalline grain 64'. A second deposit of the transparent metallic layer 66 forms the "intermediary electrode" receiving electrons and transmitting them to the salt grain 64'. If desired a light concentrating body formed, for instance, by continuation of the salt deposit can fill up the cone.

It is also possible to introduce the secondary electron producing devices in the cathode television tube by placing them directly on the black filter.

Figure 26:
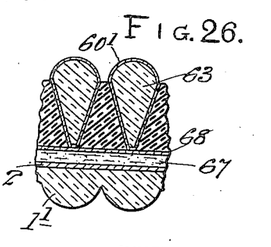
Fig. 26 represents a detail section of a modified form of filter in which a liquid with discoidal suspension is substituted for the crystalline salt layer.

Fig. 26 shows schematically the case in which the light controlling layer is constituted by a liquid containing a suspension of small particles of discoidal shape, which are oriented (according to a known method) by electric fields produced by the scanning electronic television beam. Fig. 26 differs from Fig. 24 in that a layer 67 of a liquid with discoidal suspension is substituted to the crystalline salt layer 62. In Fig. 26, the liquid layer 67 with its suspension is in direct contact, on one side, with the transparent anode 2, and, on the other side, with a thin lamina 68 of mica or glass, the ends of the cones 63 covered with the transparent metallic layer 60' bringing electric capacity charges which orient the suspension and increase the transparency of the liquid. But the thin layer 68 can be omitted, and the metallized ends of the cones 63 will be in this case in direct contact with the liquid; or the liquid may simply be substituted for the salt in the ducts 4" (for instance in Figs. 22 and 23).

In the case using a liquid with suspension the black filter does not need to be heated, although a slight heating may be favorable in reducing the viscosity.

Introducing the principle of the black filter for light control through a liquid suspension, presents, comparatively to the same system without black filter, the same great advantages. But a special advantage is introduced by the fact that the rapidity of disappearance of the micro-image on this liquid microfilm can be easily controlled and increased at will by small displacements of the liquid in the form of a continuous or discontinuous current, or in the form of small periodical oscillations having, for instance, the frame frequency, which can be used for control of image disappearance, and of storage effects. The technique of liquid television valves is known and will not be described here.

The invention provides also an important modification in the construction and distribution of the black filter, applicable for both types of light valves: with sensible salt layer or with suspension liquid or otherwise. It is based on use of a new special kind of glass (or plastic) having in one direction—generally normal to the plate or sheet—a relatively great electric conductivity, and being completely transparent at least in this same direction with a good transparency in other directions. Such glasses, and glass (or plastic) blocks and plates, can be made by incorporating in the glass mass or in the plate a multiplicity of extremely fine and straight conductive strands extending from one surface of the plate to another.

Such glass can be made, for instance, by preparing and fixing together at a conveniently high temperature a multitude of thin parallel glass laminae, the surface of each lamina having a deposit of a multitude of a very fine parallel or non-parallel lines of appropriate metal or other conductive material. After a careful welding of these laminae, or other mode of mutual fixation, the glass block can be cut, perpendicularly or at any desired angle to the metallic ducts, into plates of the desired thickness. The glass itself and method of its fabrication are covered by copending application Serial Number 682,992, filed July 12, 1946.

Figures 27, 28, 29, 30, 31, 32, 33:
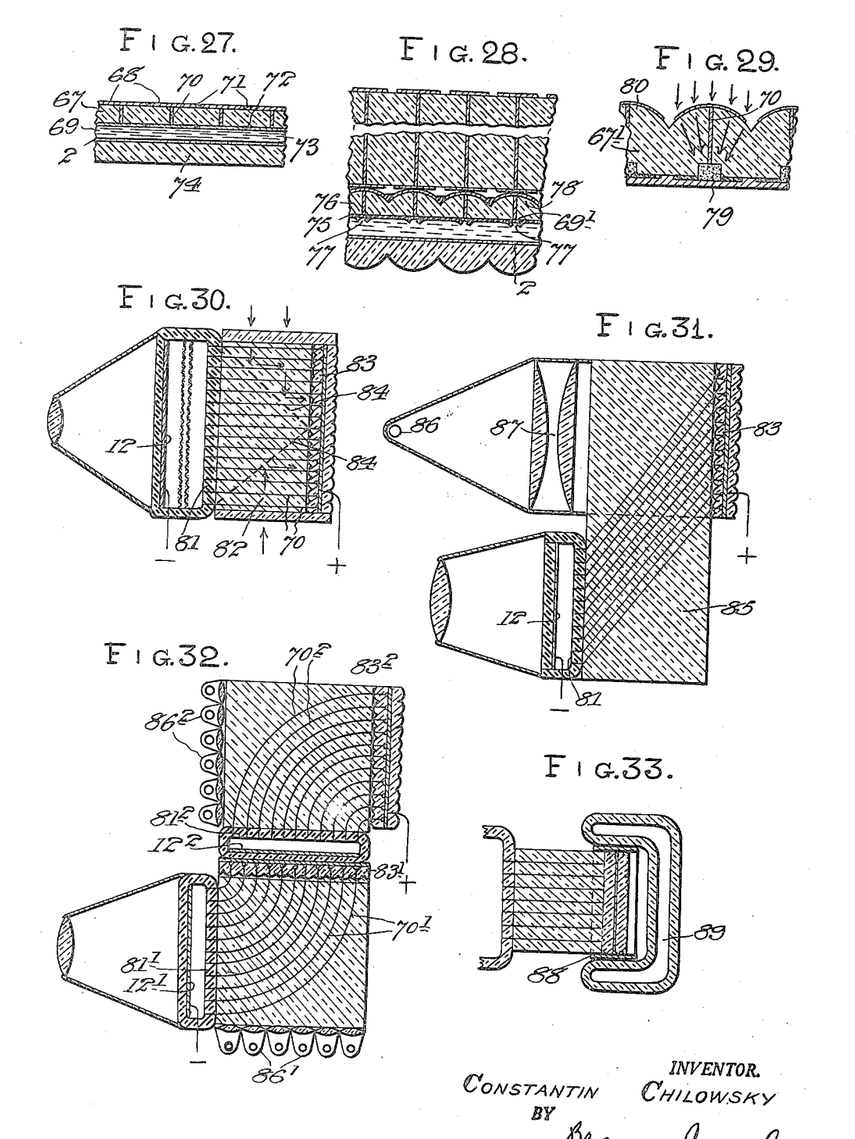
Fig. 27 represents a section through a modified form of light valve element, utilizing a glass with linear conductivity and a fluid with orientable suspension.
Fig. 28 represents a section through another form of light valve having the elements of Fig. 27 combined with a black filter.
Fig. 29 represents a section through a further modified form of black filter light valve.
Fig. 30 represents a median section through a photocathode image intensifying device.
Fig. 31 represents a median section through a modified form of photocathode image intensifying device.
Fig. 32 represents a median section through a device similar to that of Fig. 31 but with formation of a positive image from an intermediate negative image.
Fig. 33 represents a median section through a particular form of black filter heating device.

For the purpose of the black filter the two surfaces of such a plate 67 with linear conductivity are covered, preferably on both sides, as shown in Fig. 27, with a multiplicity of small separate and mutually insulated transparent metallic areas 68 and 69, each pair of opposite areas being mutually electrically connected by at least one very fine conductive strand 70; the narrow lines or bands separating the small metallic deposits are covered with non-transparent insulating material 71 (on one side) and 72 (on the other side); 73 is the liquid with orientable suspension, forming the light valve and being in direct contact with the metallic areas 69; 2 is the transparent anode and 74 is the transparent plate supporting the anode.

The electric charges of the electronic beam scanning the metallic areas 68 are immediately transmitted respectively to the connected areas 69, the electric field of these charges insuring the orientation of the suspension. The suspension liquid 73 having generally a certain although very small electric conductivity, the orientation disappears as soon as the potential in 69 has dropped sufficiently and that is a great advantage of this method (although the usual disorientation by second scanning with low velocity electrons can be used).

The light valve screen represenated in Fig. 27 is a new type of light valve with direct contact with the liquid.

In the arrangement of Fig. 27 a crystalline layer of sensible salt can be substituted for the liquid suspension layer 73, provided that the screen is maintained at high temperature.

The light valve of Fig. 27 uses no electronic concentration. But it can be transformed into a black filter light valve with electronic concentration, with light concentration, and with micro-image formation on a microfilm, as shown in Fig. 28, by depositing a layer 75 of completely opaque insulating material on the surface of the plate 76 in contact with the active valve material. This non-transparent layer covers all the surface with exception of the small areas 77 which remain in direct contact with the active material, and through which pass the light concentrated by the convexities 78.

The transparent metallic areas form with the anode 2 an electric condenser periodically charged by the scanning beam. By making these areas 69' (under the black deposit) greater or smaller one can change the duration of orientation of the suspension, or the rapidity of disappearance of the opacity image in the salt.

Fig. 29 shows a variation in which the active valve material (sensible salt or liquid suspension) is contained in the cavity 79. (These cavities can be obtained and exactly positioned in the focus of light concentration, for instance, by a photogravure procedure.) The formation of these cavities will greatly facilitate the deposit of the active material and of the opaque layer. In cases when the cavity 79 is filled with sensitive crystalline salt, it is possible to insure the metallic contact with the salt only through the pointed end of the conductive strand 70. In these conditions of extremely concentrated electric forces the electron will be able to go from the metallic point into the salt even at ordinary temperature, or at a lower temperature than normally needed.

The black filter of the type of Figs. 28 or 29 can constitute the wall of a television tube, and the plate 67' of the filter can be soldered into the tube, the metallized convexities 80 being exposed to the scanning beam. The deposit of active material (salt or suspension liquid) will constitute the exterior structure which can be changed without opening the tube. Alternatively, the wall of the television tube exposed to the scanning beam may consist in the glass plate 67 with linear conductivity, shown in Fig. 27, of sufficient thickness and of completely tight construction, with the double mosaic of transparent metallic areas 68 and 69. The black filter of the type for instance of Fig. 28 or 29, will be conveniently firmly applied to the glass wall with linear conductivity, and the projection light, and also the electric charges of the beam will be directly transmitted through this wall to the black filter, which becomes in this way completely exterior and interchangeable, and working at normal atmospheric pressure.

The black filter of Fig. 29, if used with liquid suspension, has the advantage that the suspension liquid contained in small closed capsules cannot undergo any objectionable settling. Furthermore, the exposure of such a black filter to mechanical oscillation, for instance of supersonic frequency, will insure the homogeneous distribution of the suspension in the liquid.

The invention provides also that high frequency mechanical oscillation may be used in order to accelerate the disorientation of previously oriented particles suspended in the liquid (in valves using such suspension). Normally, after the disappearance of electric forces orienting the suspension in the direction of the field, the particles return to their normal chaotic orientation, obturating the light along a special time curve occupying an appreciable time interval independent from the previously applied electric field. On the contrary, under influence of mechanical oscillating in the direction normal to the surface and of a very high frequency, the particles become oriented parallel to the surface, that is, in a direction perpendicular to that produced by the electric field. It becomes thus possible, upon introducing by these oscillations, this active light extinguishing orientation on one hand and by increasing the electric field on the other hand, to obtain an essential shortening of the light extinguishing time interval, and an essential shortening of the television frame period. A quartz plate of appropriate thickness, constituting, for instance, the support of the anode, and maintained in sufficiently strong mechanical resonance oscillation by an appropriate high frequency oscillating electric circuit, can produce this oscillation.

The glass with linear conductivity cannot only form part of the black filter, or constitute the wall of the television camera, bringing the scanning phenomena to the other side of the wall, but this glass permits very important developments and improvements of the described method of image—and specially television image—intensification and projection.

Indeed, the described light valve control with sensible salt or liquid suspension can generally be operated by electric charges and potentials produced by projected electrons. The invention provides that this variation of electric charges and potentials can be transmitted—by means of this glass or plastic with linear conductivity—from the vision camera or from the television tube at an appreciable distance, and at this distance can exert its action on the described light valve screen or black filter. Moreover, it is provided that by convenient shaping and cutting and adjusting of this special glass (or plastic) this electric action can be transmitted and transposed—without disturbance of the image it carries—in a plane differently oriented and of much greater linear dimensions than the initial vision or scanning plane.

A black filter of great linear dimensions conveniently adjusted to this greater glass or plastic surface carrying these electric impulses, can be operated from a much smaller television scanning screen, or much smaller vision camera. The projection of strong light through this black filter will reproduce with great brightness and in greatly enlarged size the small initial electronic image.

Fig. 30 shows schematically an image intensification camera provided with the screen 81 protecting the photocathode 12 from lateral light projection. This screen is constituted from a relatively thick glass plate with linear electric conductivity, but of completely opaque, non-transparent glass, which will be called "black glass." Between this black glass screen 81 and the black filter 83, of one of the above described types (for instance of Fig. 29), is interposed a thick glass plate 82 with linear conductivity, but nearly completely transparent.

The plates 81, 82 and the black filter 83 are closely applied together in such a manner that the ducts or strands 70 of the respective plates are electrically connected—duct per duct—so as to form a multitude of continuous ducts transmitting the electric charges, point by point, to the black filter. These individual electrical connections between the ducts of two such surfaces can, for instance, be insured by covering one of the surfaces with a regular mosaic of small mutually insulated metallic areas, each area being in electric contact with the corresponding duct. On the opposite contact surface the ends of the ducts may be thickened by electrolytic deposit of an excess of any ductible metal, so that the electric contact between the mosaic elements and the ends of the ducts will be insured by simple pressure between the surfaces. The surfaces can be, if necessary, stuck together by an appropriate insulating paste, or both surfaces can have accurately coordinated mosaics, and an insulating paste with fine suspension of a ductile metal can be applied between the surfaces; after squeezing the paste the suspended particles will insure the contact. In cases when the black filter surface is shaped in form of light concentrating convexities (as shown in Figs. 28 and 29), the remaining space between these convexities and the plane surface of the plate 82 can be filled if desired with a material of low refraction index, or glasses with different refraction index may be used, the matching surfaces being shaped with complementary concavities and convexities fitting together and insuring the light concentration.

Preferably the black plate 81 (Fig. 30) will be welded to the walls of the vacuum camera which contains the photocathode 12, and which can, if desired, contain the secondary electron amplifying device (such as 25, Fig. 10 or 41, Fig. 17). The electron receiving surface of the black plate 81, has a mosaic of metallic areas coordinated with respective ducts or strands.

If desired the plate 82, assumed to be rectangular, can be cut into three prisms as shown by dotted lines 84, with non-transparent reflecting surfaces, reflecting the laterally projected light (shown by arrows) on the black filter.

Fig. 31 shows the transmission of electronic action of the vision camera containing the photocathode 12 and the black wall 81, to the black filter 83, through a transparent body 85, with conductive strands going in oblique direction from the black wall to the black filter, the light being projected on the black filter directly by the source 86 and the lens 87, from the same direction from which comes the image. The light valves are assumed to be the type with liquid suspension, so that a positive image is reproduced at the exit of the black filter.

Fig. 32 shows a similar arrangement comprising; the first photocathode $12'$, the black plate $81'$, ducts $70'$ going to the first black filter $83'$ with sensible salt; a light from the source $86'$ projected through the black filter $83'$ on the second photocathode $12^2$; a second black plate $81^2$; the ducts $70^2$ going to the second black filter $83^2$ supposed to be also with sensible salt; and light from the source $86^2$, projecting through this filter a positive image. In this figure the ducts are curved but they could also be straight.

Fig. 33 shows a black filter with sensible salt placed at the end of a transparent glass block with linear conductivity, the filter being maintained at high temperature by inductive electric heating by the ring 88 and being protected from excessive heat losses by a transparent Dewar capsule 89. The other end of the glass block is conveniently applied to a wall with linear conductivity of a television or vision tube, which can remain at relatively low temperature.

Figure 34:
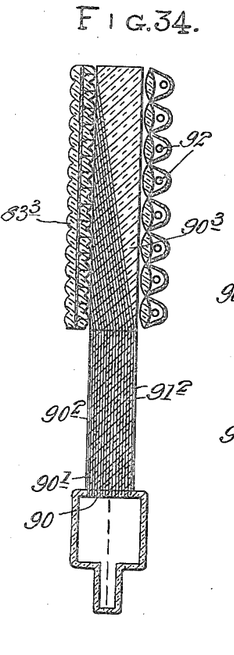
Fig. 34 represents a longitudinal section through a television image enlarging and intensifying apparatus.
Figure 35:
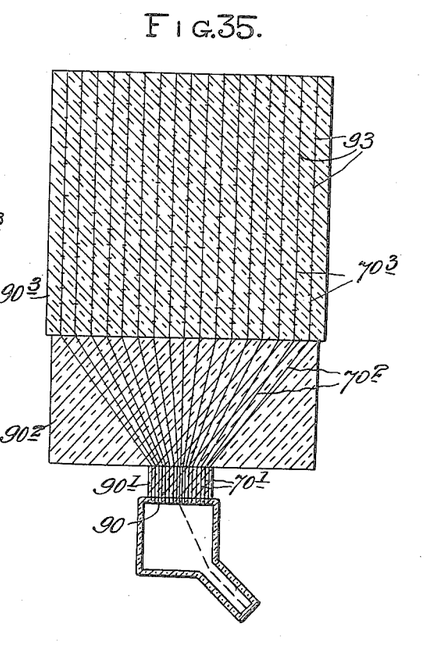
Fig. 35 represents a median section taken at a right angle to the plane of Fig. 34.

Figs. 34 and 35 show an example where the electric action of a scanning television beam (or of an electronic image projected in a vision camera) is transmitted to a screen, such as a television or vision screen with much larger dimensions than the initial electronic image.

In Fig. 34, the wall of glass 90 with linear conductivity forms the scanning screen of the television tube; an optional intermediate block $91'$ with linear conductivity is applied and conveniently adjusted to the wall 90; $90^2$ is a body with linear conductivity, preferably of a convenient plastic which need not be transparent, composed of a multitude of sheets or laminae $91^2$; $90^3$ is a large square plate with linear conductivity, of a transparent plastic material. The vertical plastic laminae composing the plate $90^3$, are oriented perpendicularly to the large surface of the plate and at right angles to the laminae $91^2$ composing the body $90^2$. The laminae $91^2$ of the plate $90^2$ contain divergent conductive strands or ducts $70^2$, connecting the ducts $70'$ of the body $90'$ with the ducts $70^3$ of the body $90^3$, which run to the large surface of the plate $90^3$, to which a black filter $83^3$ of large dimensions is conveniently applied. This black filter may, if desired, be formed of a certain number of small black filters. The ducts $70^3$ need not form straight lines, but can for instance form curves which come out normally to the surface. A suitable number of projection lamps 92 project light through the black filter and reproduce the television, or vision image.

Fig. 35 is a section on the median plane of Fig. 34. In this figure $70^2$ are the divergent conductive ducts connecting the ducts $70'$ with the wider spaced ducts $70^3$ of the plate $90^3$. 93 are the exit points of the ducts 70³ which cover the surface of the plate with a multitude of conductive points at regular intervals from each other.

Figure 36:
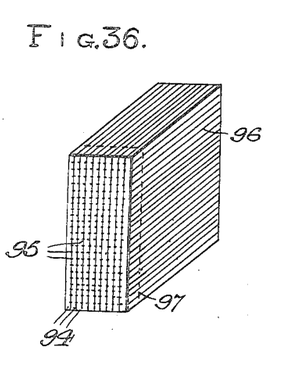
Fig. 36 represents a perspective view of a block of material with linear conductivity.

Fig. 36 shows in perspective a normal block of plastic material or glass with linear conductivity, from which other forms can be cut or can be derived. In this figure 94 are the laminae; 95, the exit points of the ducts 96. The dotted line 97 shows a possible cut in the block in order to provide a plate or wall with linear conductivity.

Figure 37:
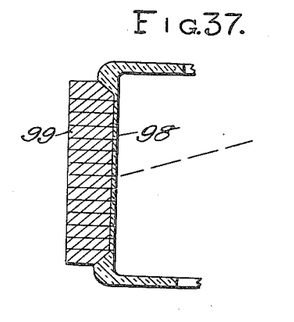
Fig. 37 represents, in section, a modified detail of construction of the end of a television tube.

Fig. 37 shows the case when the scanning receiving wall of a television tube is constituted by a thin glass lamina 98 with linear conductivity, mechanically consolidated with a thick plastic plate 99 with linear conductivity, strongly stuck to the glass plate. The thin glass plate 98 attached to the television tube can, if desired, be formed by a multitude of fine perforations made for instance by electric sparks or any other method, and filled with metal by electrolytic deposit, or other procedures.

Conductive strands or ducts can be made for instance by covering a glass or plastic lamina with a fine protecting layer of appropriate masking material, and then by removing this material along a multitude of fine lines, as by suitable mechanical devices. The metallic deposit can then be made along these exposed lines by any known procedure, for instance vacuum deposit, or silvering etc., with reinforcement by electrolytic deposit if necessary. Or else, narrow grooves can be made on glass laminae, filled with metallic or conductive deposit or material, or a conductive paste containing metal or carbon, and the surface then being cleaned.

The glass laminae are welded together when absolute tightness is needed, or they can be secured by a suitable adhesive. Plastic laminae are welded or stuck by any appropriate means. It is provided that by use of deposits of special metals or conductive agglomerations the bodies of linear conductivity can be deformed, stretched, changed in section etc., without destroying the continuity of the conductive ducts.

The number of strands or ducts corresponds at least to the number of points constituting the television or vision image. For instance the scanning wall of a television tube with 200,000 points of an image of 18 cm. of linear dimension will have 200,000 ducts at a mean distance from each other of 0.4 mm.

The same number of ducts on the final television screen of 1 m.² will have a means distance of 2.2 mm.

For the body with linear conductivity shown in Figs. 34 and 35 and consisting in at least two blocks with differently oriented initial laminae in each, can be substituted a single block or plate constituted of a multiplicity of thin sheets, for instance of plastic material, parallel to the surface of the final large screen, each sheet having a part with ducts or strands, these ducts continuing, on the large square part of the plate, in more distant parallel ducts. This part of the plate with parallel ducts can be then cut, oblique to the great surface, forming thus a stretched prismatic body, the ducts terminating on the cut surface at equidistant points, ready for connection with a large black filter. The unified body may consist in a multitude of plastic laminae perpendicular to the surface of the great screen, these laminae being of variable thickness (similar to those shown in Fig. 35 but without interruption). The ducts are conveniently shaped and terminate at the great screen surface at equidistant points.

The invention provides that the metallic ducts in the body with linear conductivity can be constituted not only by fine metallic deposits but also by fine wire strands of appropriate metal or alloys such as silver, copper, tungsten, platinum, etc., fixed on the surface of the laminae before their putting or welding together.

The incorporation of the ducts in the plastic material can be made by fixing the metallic wire on a rotating cylindrical surface covered with plastic and by depositing then a layer of plastic material in a state of solidification or already solidified, increasing the thickness of the rotating body by alternating layer and wires superposition. The distance between the wires and their angular orientation can be controlled and periodically changed, if necessary, by appropriate devices.

What I claim is:

1. Apparatus for intensifying electronic images comprising, a source of electrons, a black filter of opaque material having a multiplicity of electron-conductive orifices distributed throughout the area of the filter, the total cross-sectional area of said orifices being a small fraction of the total filter area, electron-responsive material associated with said orifices and adapted to constitute light valves controlling the passage of light through and beyond said orifices, and means for concentrating the electrons of a unit cross-sectional area substantially greater than the area of each orifice on the electron-responsive material associated with the orifice included within said unit area.

2. Apparatus according to claim 1 which includes a relatively extended electron-receiving area adjacent each orifice, and means for concentrating the electrons received by said area in the most restricted part of the orifice.

3. Apparatus according to claim 1 which includes a relatively extended crystalline salt area adjacent each orifice in continuity with a body of crystalline salt in the most restricted part of the orifice.

4. Apparatus according to claim 1 which includes a relatively extended transparent metallic area adjacent each orifice in electrical communication with a body of crystalline salt in the most restricted part of the orifice.

5. Apparatus according to claim 1 which includes a high frequency vibrating quartz plate adapted to vibrate the electron-responsive material.

6. In an apparatus for intensifying electronic images, a black filter comprising a body of opaque material traversed by a multiplicity of small orifices distributed throughout the area of the filter, and optical means associated with said orifices for concentrating light projected on said filter in said orifices.

7. An apparatus according to claim 6 in which the optical means comprise suitably shaped crystalline salt bodies extending into the orifices.

8. An apparatus according to claim 6 in which the optical means comprise inverted cone shaped crystalline salt bodies having their apexes extending into the orifices.

9. An apparatus according to claim 6 in which the optical means comprise suitably shaped bodies of transparent material having transparent electron-conductive material on their surfaces and extending into contact with a conductive material in the orifices.

10. In an apparatus for intensifying electronic images, a black filter comprising a body of opaque material traversed by a multiplicity of small orifices distributed throughout the area of the filter, and optical means associated with said orifices for directing in a parallel beam the light emerging from said orifices.

11. In an apparatus for intensifying electronic images, a black filter comprising a body of opaque material traversed by a multiplicity of small orifices distributed throughout the area of the filter, means for scanning the filter with an electronic television scanning beam, a source of light projected on the filter, optical means associated with said orifices for concentrating said projected light in the orifices, and optical means associated with said orifices for directing in a parallel beam the light emerging from the orifices.

12. Apparatus according to claim 11 which includes, electronically actuated light valves adapted to control the passage of light through and beyond the orifices, and means for concentrating the electrons of the scanning beam in each orifice for actuation of the respective light valve.

13. The method of intensifying electronic images formed in a screen including electron-responsive material adapted to vary in transparency as a function of electronic action which comprises, directing a stream of electrons toward said screen and concentrating the electrons of a unit cross-sectional area on a section of said electron-responsive material the area of which is a small fraction of said unit area.

14. The method according to claim 13 which includes projecting a beam of light through and beyond said section of material under the control of said concentrated electrons.

15. The method according to claim 14 which includes concentrating a unit cross-sectional area of said light beam on the corresponding section of material.

16. The method according to claim 14 which includes preventing the passage of light through and beyond any areas of the screen other than those on which the electrons are concentrated.

17. The method according to claim 13 in which the stream of electrons is a scanning beam.

CONSTANTIN CHILOWSKY.

REFERENCES CITED

The following references are of record in the file of this patent:

UNITED STATES PATENTS

| Number | Name | Date |
| --- | --- | --- |
| Re. 22,115 | Herbst | June 16, 1942 |
| 2,121,990 | Schroder et al. | June 28, 1938 |
| 2,277,008 | Von Ardenne | Mar. 17, 1942 |
| 2,277,009 | Von Ardenne | Mar. 17, 1942 |
| 2,335,659 | Fraenckel et al. | Nov. 30, 1943 |
| 2,366,319 | Donal, Jr. | Jan. 2, 1945 |